Nov. 20, 1923. 1,474,551
H. D. POWNALL
ARTIFICIAL ICE MAKING APPARATUS
Filed Jan. 17, 1922 2 Sheets-Sheet 1
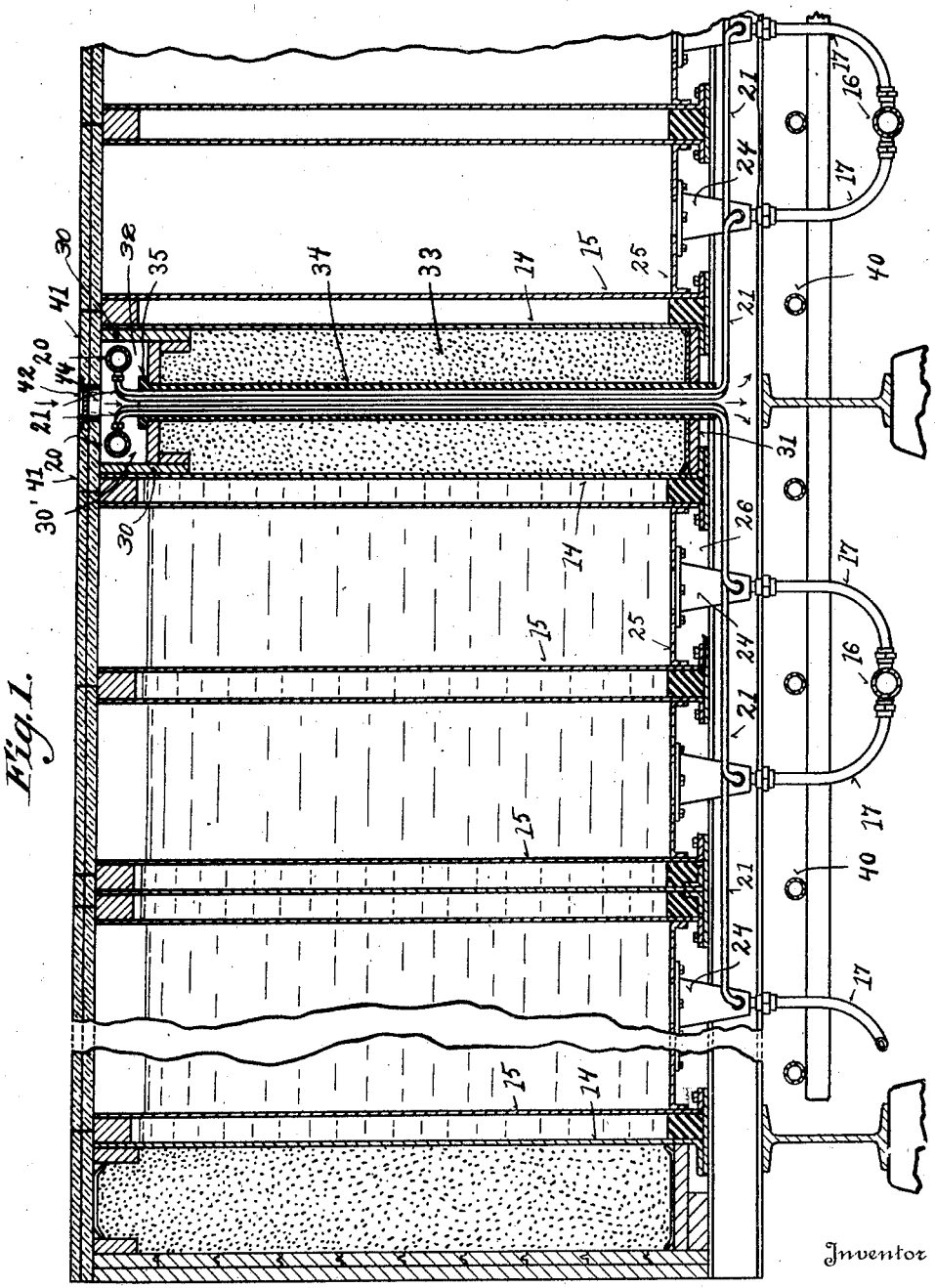
Inventor
Henry D. Pownall,
By C. W. Miles,
Attorney

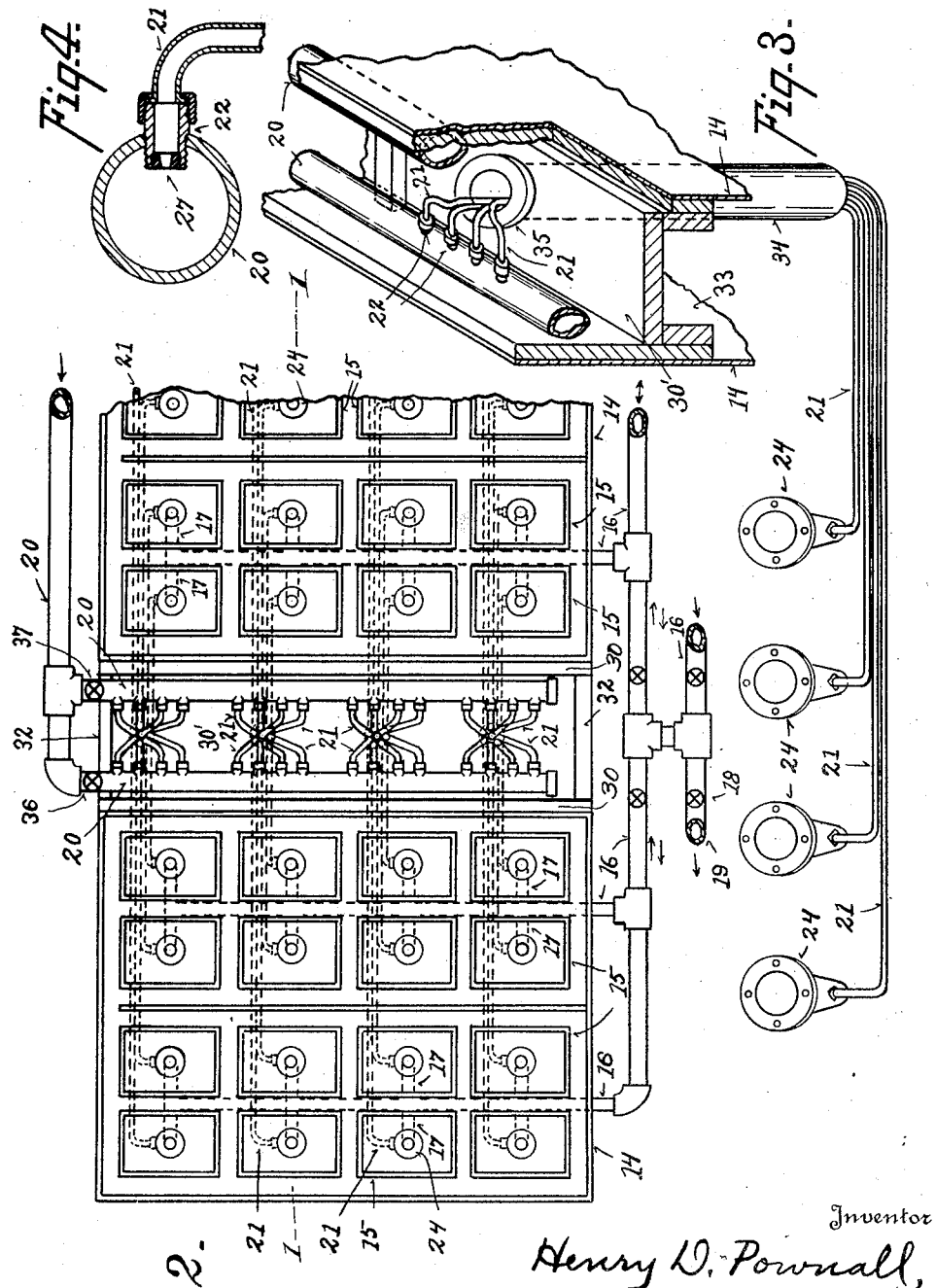

Patented Nov. 20, 1923.

1,474,551

UNITED STATES PATENT OFFICE.

HENRY D. POWNALL, OF CANTON, OHIO.

ARTIFICIAL-ICE-MAKING APPARATUS.

Application filed January 17, 1922. Serial No. 529,992.

*To all whom it may concern:*

Be it known that I, HENRY D. POWNALL, a citizen of the United States, residing at Canton, in the county of Stark and State of Ohio, have invented certain new and useful Improvements in Artificial-Ice-Making Apparatus, of which the following is a specification.

My invention relates to improvements in artificial ice making apparatus. One of its objects is to provide improved freezing tank apparatus. Another object is to provide improved means to supply currents of air to the several respective ice molds, and to prevent the accumulation of frost or ice in the air conduits so as to close or obstruct said air conduits. Another object is to protect the air conduits from excessive refrigeration. Another object is to provide an improved arrangement and structure for the assembly, removal and renewal of the various air conduits. Another object is to provide an improved combination of air conduits and fresh water supply conduits to the respective ice molds and means to protect and insure them against excessively low temperatures liable to render them inoperative or permanently injured. My invention also comprises certain details of form combination and arrangement, all of which will be fully set forth in the description of the accompanying drawings in which:

Fig. 1 is a vertical section through a plurality of freezing tank units of an artificial ice machine apparatus, taken on line 1—1 of Fig. 2, and embodying my invention.

Fig. 2, is a plan view of the same with the tank floor omitted.

Fig. 3, is a perspective view of a group of branch air conduits leading from a main air conduit to the respective ice molds.

Fig. 4 is a sectional detail of the means employed to couple the several air branch conduits to the main air conduits.

The accompanying drawings illustrate the preferred embodiment of my invention in which 14 represent a plurality of substantially duplicate tank units, of which there may be a considerable number, depending upon the capacity of the installation. Each of said freezing tank units is provided with one or more, usually a considerable number of ice cans or ice molds 15, mounted therein in a semi-permanent manner with an opening in the bottom of the tank for each ice mold through which opening a system of fresh water supply main conduits 16 and branch conduits 17 are connected to the respective ice molds to provide for supplying fresh water to refill all the ice molds of a designated freezing tank unit at one operation. Said system of conduits is provided with a valve 18 and branch 19 so as to serve as a drainage system by means of which fresh water, particularly unfrozen residues charged with salts or other impurities may be withdrawn from all the ice molds of a designated freezing tank at one operation. A system of air main conduits 20 and branch air conduits 21 are also connected to the bottom of each ice mold in order that air may be introduced at the bottom into the respective ice molds so as to rise in the form of bubbles through the fresh water in the ice molds during all or part of the freezing operation in order to provide a circulation and agitation of fresh water in the ice molds to detach or release impurities such as salts sediment and gas bubbles from the face of the forming ice.

In practice cold brine is circulated to and from the respective ice molds through cold brine conduits not shown and when the circulation of cold brine to a designated freezing tank unit is cut off to harvest the ice, brine from a designated freezing tank is circulated from said tank through a heating element to warm a portion of the brine which is then returned and mixed with the cold brine of the tank until the brine of the tank is warm enough to release the ice from the molds. Thus all the ice molds of a designated tank unit are filled or refilled with fresh water at one operation; the freezing operation is completed in all the ice molds of the designated tank unit at once, and the harvesting of the ice from said tank unit is effected at one operation, ready to repeat the cycle of operations.

The air supply conduits are liable to carry water or moisture, mainly the result of condensation of moisture from the air upon its being cooled, in sufficient quantities to be liable to accumulate as frost or ice upon the interior of the air conduits particularly the branch air conduits 21, when subjected to sufficiently low temperatures so as to be liable to partly or wholly obstruct a part or all of said air conduits and even to burst and thus permanently injure said conduits. In like manner if subjected to sufficiently low temperatures the fresh water supply conduits are liable to have the fresh water frozen therein so as to obstruct said fresh water conduits or even to burst and permanently injure said fresh water conduits.

The low temperatures necessary to freeze water either in the air conduits or in the fresh water conduits may result either from radiation or conduction from the freezing tank units and cold brine conduits, or from externally and naturally developed low temperatures in winter, against which artificial ice houses are frequently imperfectly protected, or from a combination of both.

The main or trunk air conduits 20 are preferably located above the level of fresh water in the ice molds in order that fresh water may not back up in the branch air conduits sufficiently so as to enter the main air conduits by flowing thereto from the ice molds, as for instance while the ice molds are being refilled, and before a current of air is supplied through the air conduits 20 and 21. At the commencement of each branch conduit 21, I preferably provide a coupling member 22 which is threaded through the side wall of the conduit 20 so as to project into the interior thereof, while the branch conduit 21 is threaded to the outer end of said coupling member 21, and the opposite end of the branch conduit 21 is threaded to or coupled to a coupling member 24 attached to the bottom 25 of one of the ice molds 15 through an opening 26 in the bottom of the freezing tank unit 14. In order to prevent the branch conduits 21 from becoming stopped up and rendered inoperative through the introduction of solid foreign matter with the air current, and also to distribute and regulate the air supply to the several branch conduits 21 as uniformly as possible I preferably provide the restricted air inlet orifices 27 located at the inwardly projecting ends of the coupling members 22 where they are less liable to receive any solid matter carried into the air conduits 20 by the air current, and where any such foreign solid matter is free to fall away from such orifices 27 and to the bottom of the conduits 20 as soon as the air currents cease temporarily to flow, thereby tending to keep said air conduits open and in operative condition.

Where the air mains 20 enter between two freezing tank units and are thereby more strongly exposed to the refrigerating action from the freezing tanks, partial insulation and protection therefore is afforded by the wooden trough or box structure 30 which is interposed near the top between the two adjacent freezing tank units, thereby providing beneath the tank room floor and between the freezing tanks a partially insulated compartment 30' to receive and protect the air mains and the connections of the air branch conduit 21 thereto providing for an unobstructed tank room floor and enabling convenient access to be had to said air conduits when required. At the bottom of the space between the freezing tank units a wooden bottom 31 is inserted and vertical end sections 32 are inserted between the freezing tank units to provide a closed compartment 33 below the structure 30 which compartment 33 is preferably filled with an insulating material such as mineral wool or granulated cork for instance. Extending down from the compartment 30' through the insulating material in the compartment 33 and through the bottom 31 are a plurality of tubes 34 constructed for instance from wood cork-board, or asphalt treated cardboard. Said tubes are preferably held in position laterally by passing them through perforations in the bottom of the compartment 30' and through the bottom board 31, and are held in place endwise by means of collars or flanges 35 at their upper ends.

The respective branch air conduits 21 which may be copper tubes of relatively small diameter are adapted to be separately inserted or threaded through the tubes 34 until each tube 34 carries the number requisite to make connection with each ice mold in same row with the tube 34, and in the two tanks at opposite sides of said respective tubes. After the tubes 21 have been threaded through the tubes 34 each tube 21 may be separately coupled at the top to a coupling member 22 as shown in Fig. 4, and at its lower end in like manner coupled to one of the members 25 at its lower end. Valves 36 and 37 provide for independently cutting off the air supply to all the ice molds in either of the freezing tank units. Each of the tubes 34 forms a passage way for tubes 21 to each of the adjacent tank units, and at the same time together with the insulating material in the compartment 33 serves to protect the tubes 21 from an excessive refrigerating effect from said tank units. In the event that any one of said branch conduits 21 should become closed or injured from any cause the particular tube may be conveniently loosened at either or both ends and removed without materially disturbing any of the other conduits 21, and may be replaced or renewed as may be required.

In ordinary weather and operating conditions those portions of the air branch conduits 21 and those portions of the fresh water conduits adjacent to or under the tank units are not subjected to freezing temperatures or liable to have water or moisture solidify therein. In order to avoid a freezing temperature which might result in solidifying water in the air or fresh water conduits under or adjacent to the tank units due to abnormal weather conditions or abnormal artificial refrigeration and to assist if necessary in harvesting the ice I provide a system of valve controlled heating conduits 40 beneath the respective tank units to which steam or warm brine may be admitted to raise the temperature of the air beneath the tank units.

As a further precaution against excessive cooling of those portions of conduits 21 within the tubes 34 due to the proximity of the freezing tanks at opposite sides thereof I preferably provide a series of ports 44 leading through the tank room floor 41 into the compartment 30' and thereby establishing a series of relatively warm air currents either downwardly or upwardly, usually downwardly, through the tubes 34 and alongside the conduits 21 therein to displace any cold air in the tubes 34 of sufficiently low temperature to cause injury to the conduits 21. I also preferably provide detachable metal caps 42 which may be employed when desired to close the ports 44 so as to cut off the circulation of relatively warmer air through the tubes 34 when conditions are such as to render a circulation of air through the tubes 34 unnecessary or undesirable.

The apparatus herein shown and described is capable of considerable modification without departing from the spirit of my invention.

What I claim is:

1. An artificial ice making apparatus comprising a plurality of freezing tank units each provided with a plurality of ice molds, a valve controlled main air conduit located above the upper surface of fresh water in said ice mold and located between said freezing tank units, and a plurality of branch air conduits each detachably connected at one end to one of said main air conduits and at its opposite end to the bottom of one of said ice molds so as to be independently detachable and replaceable without disturbing the other branch air conduits and one or more downwardly directed heat-insulated tubular passages interposed between said tank units through which said branch air conduits pass and through which they may be withdrawn or replaced.

2. An artificial ice making apparatus comprising a plurality of freezing tank units each provided with a plurality of ice molds, a valve controlled main air conduit located above the upper surface of fresh water in said ice molds and located between said freezing tank units, and a plurality of branch air conduits each detachably connected at one end to one of said main air conduits and at its opposite end to the bottom of one of said ice molds, insulating material interposed between said freezing tank units to constitute an insulating chamber for said main air conduits with wells leading downwardly therefrom through which said branch air conduits may be passed independently of one another, whereby said main and branch air conduits between the freezing tank units are protected from the excessive refrigerating effect of said freezing tank units, and said branch air conduits are separately removable and replaceable.

3. An artificial ice making apparatus comprising a plurality of freezing tank units each provided with a plurality of ice molds, a valve controlled main air conduit located above the upper surface of fresh water in said ice molds and located between said freezing tank units, and a plurality of branch air conduits each detachably connected at one end to one of said main air conduits and at its opposite end to the bottom of one of said ice molds, insulating material interposed between the walls of said freezing tank units and said main and branch air conduits to form downwardly directed heat-insulated tubular passages to protect said air conduits from an excessive refrigerating effect from said freezing tank units and to enable the branch air conduits to be separately detached and replaced through said tubular passages.

4. An artificial ice making apparatus comprising a plurality of freezing tank units each provided with a plurality of ice molds, a valve controlled main air conduit for each freezing tank unit, located above the upper surface of fresh water in said ice molds and located between said freezing tank units, a plurality of branch air conduits each detachably connected at one end to one of said main air conduits and at its opposite end to the bottom of one of said ice molds so as to be independently detachable and replaceable without disturbing the other branch air conduits and a plurality of heat-insulated downwardly directed tubular passages located between said freezing tank units through which passages said branch air conduits pass.

5. An artificial ice making apparatus comprising a plurality of freezing tank units each provided with a plurality of ice molds, a valve controlled main air conduit located above the upper surface of fresh water in said ice molds and located between said freezing tank units, a plurality of branch air conduits each detachably connected at one end to one of said main air conduits and at its opposite end to the bottom of one of said ice molds, one or more downwardly directed tubular passages located between said freezing tank units and through which passages said branch air conduits pass, a fresh water main conduit through which fresh water may be supplied to or drained from the respective ice molds, branch fresh water conduits each connected at one end to said fresh water main conduit and at its opposite end to the bottom of one of said ice molds, and a heating element located beneath the freezing tank units and controllable by the operator to prevent solidification of fresh water in said air or fresh water conduits due to abnormal temperature conditions.

6. An artificial ice making apparatus comprising a freezing tank unit provided with a plurality of ice molds, a main air conduit located above the upper surface of the fresh water in said ice molds, a plurality of branch air conduits each detachably connected at one end to said main air conduit and at its opposite end to the bottom of one of said ice molds so as to be independently detachable and replaceable without disturbing the other branch air conduits, and insulating means at one side of said freezing tank unit forming a downwardly directed heat insulated tubular passage through which said branch air conduits pass to protect said branch air conduits against excessive refrigeration from proximity to said freezing tank unit.

7. An artificial ice making apparatus comprising a plurality of freezing tank units each provided with a plurality of ice molds, a valve controlled main air conduit located above the upper surface of fresh water in said ice molds and located between said freezing tank units, and a plurality of branch air conduits each detachably connected at one end to one of said main air conduits and at its opposite end to the bottom of one of said ice molds, insulating material interposed between said freezing tank units to constitute an insulating chamber for said main air conduits, one or more tubular passages leading downwardly from said insulating chamber through which said branch air conduits may be passed independently of one another, and means to promote a current of relatively warmer air through said tubular passages to protect said main and branch air conduits from excessive refrigerating effects due to the close proximity of said freezing tanks.

8. An artificial ice making apparatus comprising a plurality of freezing tank units each provided with a plurality of ice molds, a valve controlled main air conduit located above the upper surface of fresh water in said ice molds and located between said freezing tank units, and a plurality of branch air conduits each detachably connected at one end to one of said main conduits and at its opposite end to the bottom of one of said ice molds, insulating material interposed between the walls of said freezing tank units and said main branch air conduits to form downwardly directed tubular passage through which said branch air conduits pass, and means to promote a downwardly directed current of relatively warmer air through said tubular passage in contact with the exterior of said branch air conduits to protect said branch air conduits from an excessive refrigerating effect due to the close proximity of said freezing tank units and to enable said branch air conduits to be separately detached and replaced.

9. An artificial ice making apparatus comprising a freezing tank unit provided with a plurality of ice molds, a main air conduit located above the upper surface of the fresh water in said ice molds, a plurality of branch air conduits each detachably connected at one end to said main air conduit and at its opposite end to the bottom of one of said ice molds so as to be independently detachable and replaceable without disturbing the other branch air conduits, a heat insulated downwardly directed tubular passage located at one side of said freezing tank unit and through which said branch air conduits pass and are removable and replaceable, and means to direct a current of relatively warmer air through said downwardly directed tubular passage.

10. An artificial ice making apparatus comprising a plurality of freezing tank units each provided with a plurality of ice molds, a horizontally directed heat insulated compartment located between the upper portions of said tank units and below the tank-room floor, a heat insulated tubular passage leading downwardly from said insulated compartment between said tank units to substantially the bottom of said tank units, a main air conduit housed within said insulated compartment and protected thereby from freezing temperatures, a plurality of branch air conduits each detachably connected at one end to said main air conduit and at its opposite end to the bottom of one of said ice molds and leading from said insulated compartment through said tubular passage.

11. An artificial ice making apparatus comprising a plurality of freezing tank units each provided with a plurality of ice molds, a horizontally directed heat insulated compartment located between the upper portions of said tank units and below the tank-room floor, a heat insulated tubular passage leading downwardly from said insulated compartment between said tank units to substantially the bottom of said tank units, a main air conduit housed within said insulated compartment and protected thereby from freezing temperatures, and a plurality of branch air conduits each connected at one end to said main air conduit at one end and at the opposite end to the bottom of one of said ice molds and leading through said tubular passage and protected thereby from freezing temperatures.

In testimony whereof I have affixed my signature.

HENRY D. POWNALL.